US011524598B2

(12) United States Patent
Niikawa et al.

(10) Patent No.: US 11,524,598 B2
(45) Date of Patent: Dec. 13, 2022

(54) VEHICLE CONTROL DEVICE (71) Applicant: Toyota Jidosha Kabushiki Kaisha, Toyota Aichi-ken (JP)

(72) Inventors: Yuka Niikawa, Toyota (JP); Yamato Niwa, Kariya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 508 days.

(21) Appl. No.: 16/682,440

(22) Filed: Nov. 13, 2019

(65) Prior Publication Data
US 2020/0156494 A1 May 21, 2020

(30) Foreign Application Priority Data

Nov. 21, 2018 (JP) .............................. JP2018-218005

(51) Int. Cl.
B60L 53/60 (2019.01)
B60L 53/14 (2019.01)
B60L 50/60 (2019.01)

(52) U.S. Cl.
CPC .............. B60L 53/60 (2019.02); B60L 50/60 (2019.02); B60L 53/14 (2019.02)

(58) Field of Classification Search
CPC ....................................................... B60L 53/60
USPC ......................................................... 320/104
See application file for complete search history.

(56) References Cited

U.S. PATENT DOCUMENTS

| 2008/0007202 | A1  | 1/2008 | Pryor |
| 2011/0175569 | A1* | 7/2011 | Austin .................... B60L 53/14 320/109 |
| 2012/0091958 | A1* | 4/2012 | Ichikawa .............. B60L 3/0069 320/109 |
| 2013/0088199 | A1* | 4/2013 | Matsuno ............... H02J 7/0071 320/109 |

FOREIGN PATENT DOCUMENTS

| JP | H11-178230 A  |   | 7/1999 |         |
| JP | H11178230  A  | * | 7/1999 | ............... H02J 7/04 |
| JP | 2009-071900 A |   | 4/2009 |         |
| JP | 2012-005227 A |   | 1/2012 |         |
| JP | 2017-108577 A |   | 6/2017 |         |

* cited by examiner

Primary Examiner — Edward Tso
Assistant Examiner — Ahmed H Omar
(74) Attorney, Agent, or Firm — Dinsmore & Shohl LLP (57) ABSTRACT A vehicle control device is configured to perform timer charging, using preset start time and end time. The vehicle control device starts the timer charging of a battery mounted in a vehicle upon arrival of the start time, and ends the timer charging upon arrival of the end time. During the timer charging, power is supplied to the vehicle from a power supply device outside the vehicle through a charging cable. The vehicle control device is configured to: suspend the timer charging when the charging cable is disconnected during the timer charging; resume the suspended timer charging when predetermined resume conditions are met, the predetermined resume conditions including a condition in which the charging cable is reconnected after the timer charging is suspended and before the end time; and end) the suspended timer charging without waiting for the end time when the resume conditions are not met.

20 Claims, 7 Drawing Sheets

VEHICLE CONTROL DEVICE

CROSS REFERENCE TO RELATED APPLICATIONS

This nonprovisional application claims priority to Japanese Patent Application No. This nonprovisional application is based on Japanese Patent Application No. 2018-218005 filed on Nov. 21, 2018 with the Japan Patent Office, the entire content of which is hereby incorporated by reference.

BACKGROUND

Field

The present disclosure relates to vehicle control devices, and, more particularly, to a vehicle control device configured to perform timer charging of a battery included in a vehicle.

Description of the Background Art

Japanese Patent Laying-Open No. 2012-5227 discloses a vehicle control device configured to charge (hereinafter, also referred to as "timer charging") a battery included a vehicle according to a preset charge schedule (more particularly, a start time and an end time). The timer charging starts charging the vehicle upon arrival of the start time of the charge schedule, end ends the charging upon arrival of the end time of the charge schedule.

SUMMARY

In contact charging (generally, also referred to as "cable charging"), the timer charging is performed while the vehicle and the charging station (more particularly, a power supply device outside the vehicle) are connected to each other via a charging cable. Supply of power, through the charging cable, from a power supply of the charging station to the vehicle is enabled by connecting to the inlet of the vehicle the connector of the charging cable which is coupled to the charging station.

A user can remove the connector of the charging cable from the inlet of the vehicle during the timer charging (hereinafter, also referred to as "cable removal part way through charging"). However, Japanese Patent Laying-Open No. 2012-5227 mentioned above does not envision the cable removal part way through charging.

A process which the vehicle control device is to perform when a cable is removed part way through charging is contemplated to be forcibly ending the ongoing timer charging, without waiting for the end time (hereinafter, also referred to simply as "kill"). However, if timer charging is always killed when the cable is removed part way through charging, user convenience may be compromised.

For example, in a narrow parking lot, the charging cable may obstruct pedestrian traffic during the timer charging. In such a situation, a user may wish to temporality withdraw the connector of the charging cable from the inlet of the vehicle, let the pedestrian pass by, and immediately thereafter reconnect the connector to the inlet and charge the vehicle again. However, if the timer charging is killed as the connector is withdrawn from the inlet as described above, the user needs to set a charge schedule again to allow for timer charging after the connector is reconnected to the inlet. Such an operation is burdensome to the user and decreases the user convenience.

The present disclosure is made to solve the above problem, and an object of the present disclosure is to provide a vehicle control device which achieves an enhanced user convenience during timer charging.

A vehicle control device according to the present disclosure is configured to perform a timer charging to supply a vehicle with power from a power supply device outside the vehicle through a charging cable. The timer charging is charging which starts charging a battery mounted in the vehicle upon arrival of a start time and ends charging the battery upon arrival of an end time. The vehicle control device according to the present disclosure includes an execution unit and a resume process unit. The execution unit is configured to perform the timer charging, using the start time and the end time which are preset. The resume process unit is configured to suspend the timer charging when the charging cable is disconnected from at least one of the vehicle and the power supply device during the timer charging, resume the suspended timer charging when predetermined resume conditions are met, and end the suspended timer charging without waiting for the end time when the predetermined resume conditions are not met. The predetermined resume conditions includes a condition in which the charging cable is reconnected after the timer charging is suspended and before the end time.

The vehicle control device suspends the timer charging when the charging cable is disconnected during the timer charging, and resumes the suspended timer charging, without killing the suspended timer charging, when the resume conditions are met. As a result, an enhanced user convenience is achieved in the timer charging by pre-setting the resume conditions so that the resume conditions are met in a situation where resumption of the suspended timer charging is requested.

More specifically, the resume conditions may be set so as to be met when the charging cable is reconnected before the end time, without the vehicle starting travelling, since the charging cable has been disconnected and the timer charging has been suspended. The "vehicle starts travelling" means that the vehicle in a non-traveling state (e.g., being parked) changes to a continuous travelling state. In the case where the vehicle just temporarily travels in a garage to be positioned, the vehicle is not regarded as having started travelling. When the charging cable is disconnected, the timer charging is suspended, and then the vehicle travels a given distance or longer (i.e., the vehicle has started travelling), the vehicle can be concluded as not temporarily travelling. The user who reconnects the charging cable before the vehicle starts travelling is highly likely to wish the suspended timer charging to be resumed. As a result, setting the resume conditions as the above can contribute to enhanced user convenience during the timer charging.

The resume conditions may be set so as to be met when the charging cable is reconnected before the end time, without an elapse of a given time period since the charging cable has been disconnected and the timer charging has been suspended. When the user immediately reconnects the charging cable, without leaving the charging cable disconnected for a while, the user is highly likely to wish the suspended timer charging to be resumed (i.e., the user is willing to continue the timer charging). As a result, the resume conditions being set as the above can contribute to an enhanced user convenience during the timer charging.

The resume process unit may be configured to determine that the predetermined resume conditions are not met when the vehicle is sensed as having started traveling in a period from when the charging cable is disconnected and the timer charging is suspended to when the charging cable is reconnected. For example, the resume process unit may be configured to determine that the predetermined resume conditions are not met when the vehicle travels a given distance or longer in a period from when the charging cable is disconnected and the timer charging is suspended to when the charging cable is reconnected.

According to the above configuration, when the vehicle starts traveling as described above, the predetermined resume conditions are determined to be not met, and the suspended timer charging ends, without waiting for the end time. As a result, the control of the vehicle is smoothly transitioned from charging control to traveling control.

The vehicle control device may further include a first change unit configured to change, when the predetermined resume conditions are met, the end time of the resumed timer charging so that at least a portion of an amount of uncharged power is replenished. The uncharged power is power uncharged while the timer charging is suspended.

According to the above configuration, an amount of charge that is insufficient due to the suspension can be replenished by the resumed timer charging. Note that since a charge schedule may be set in accordance with a time period where an electricity cost is inexpensive, permitting the user to change the end time is not always a benefit to the user. Thus, the user may be allowed to previously select (i.e., set to the vehicle control device) one of a mode in which changes to the end time is permitted and a mode in which changes to the end time is not permitted. The first change unit may be configured to change the end time of the timer charging to be resumed, only if the change permitted modes is selected when the predetermined resume conditions are met.

The vehicle control device may further include a second change unit configured to change, if the predetermined resume conditions are met, an amount of charge per unit time of the resumed timer charging so that at least a portion of an amount of uncharged power is replenished. The uncharged power is power uncharged while the timer charging is suspended.

According to the above configuration, the amount of charge that is insufficient due to the suspension can be replenished by the resumed timer charging, without changing the charge schedule set by the user.

The execution unit may be configured to set a start time and an end time for each of a plurality of timer chargings. The plurality of timer chargings may include a first timer charging and a second timer charging. The vehicle control device may further include a third change unit configured to change, if the predetermined resume conditions are met, at least one of a start time and an end time of the second timer charging so that at least a portion of an amount of uncharged power is replenished by the second timer charging. The uncharged power is power uncharged while the first timer charging is suspended.

According to the above configuration, the amount of charge that is insufficient due to the first timer charging being ended part way through, can be replenished by second timer charging (e.g., the next timer charging). Also in the above configuration the user may be allowed to previously select (i.e., set to the vehicle control device) one of the mode in which the change to the end time is permitted and the mode in which the change is not permitted, as described above. The third change unit may be configured to change at least one of the start time and end time of the second timer charging only if the change permitted mode is selected when the predetermined resume conditions are met.

The vehicle control device may further include an end process unit configured to at least notify or record that the timer charging has ended part way through, if the predetermined resume conditions are not met.

The user is able to confirm, from the notification or the recording, that the timer charging has ended part way through. As a result, according to the above configuration, a situation can be prevented from occurring in which the user drives the vehicle without knowing that the timer charging has ended part way through and the power stored in the battery mounted in the vehicle runs short (and hence the vehicle is short of electricity).

The foregoing and other objects, features, aspects and advantages of the present disclosure will become more apparent from the following detailed description of the present disclosure when taken in conjunction with the accompanying drawings.

DETAILED DESCRIPTION

Embodiments according to the present disclosure will be described, with reference to the accompanying drawings. Note that the same reference signs are used to refer to the same or like parts, and the description thereof will not be repeated. In the following, an electronic control unit will be referred to as "ECU."

Figure 1:
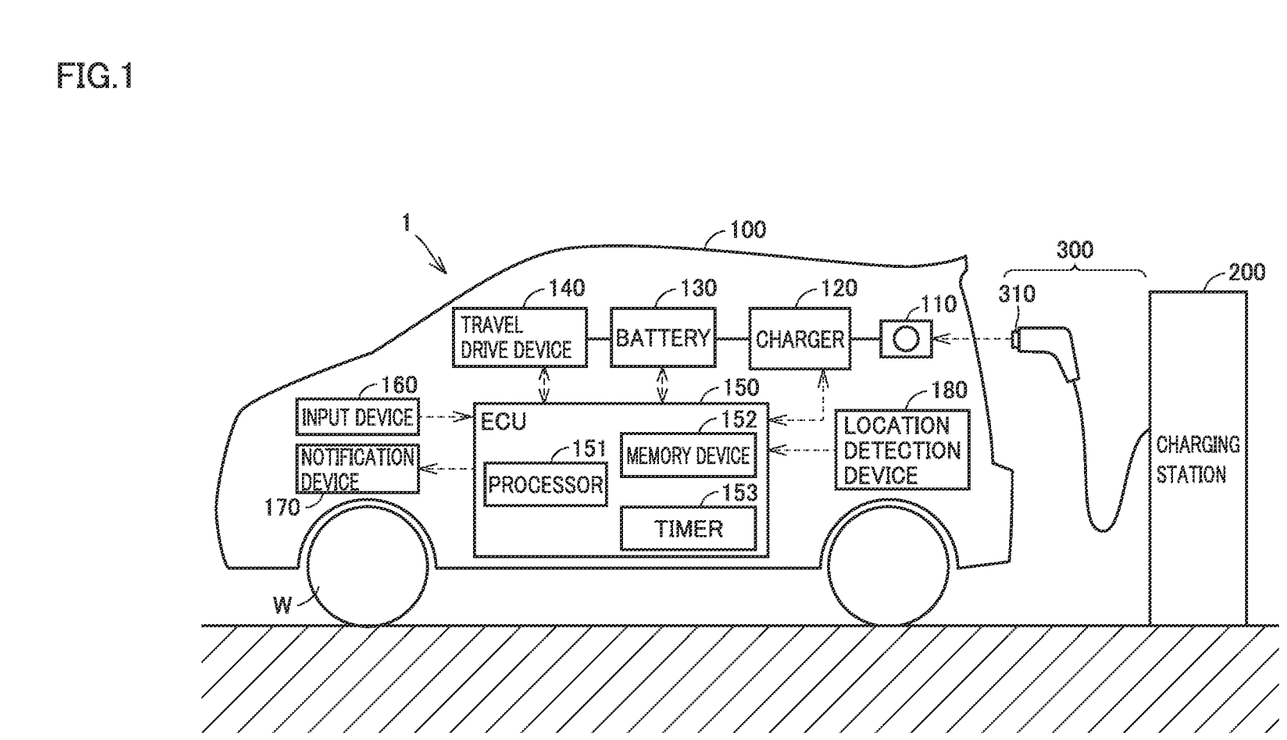
FIG. 1 is a block diagram of a charging system to which a vehicle control device according to an embodiment of the present disclosure is applied.

FIG. 1 is a block diagram of a charging system to which a vehicle control device according to the present embodiment is applied. Referring to FIG. 1, a charging system 1 includes a vehicle 100, a charging station 200, and a charging cable 300. Vehicle 100 includes a battery 130 for storing power for electric drive. Battery 130 includes a secondary battery, such as a lithium-ion battery or nickel-metal hydride battery, for example. The secondary battery may be a single cell or a battery assembly. Instead of the secondary battery, other power storage device, such as an electric double layer capacitor, may be employed. Vehicle 100 may be an electric vehicle capable of traveling using only the power stored in battery 130, or a hybrid vehicle capable of travelling using both the power stored in battery 130 and output power of an engine (not shown). Battery 130 according to the present embodiment corresponds to one example of a "battery" according to the present disclosure.

Vehicle 100 is capable of receiving the supply of power from charging station 200 and performing contact charging for battery 130. Charging station 200 may be an AC (alternating-current) charging station that has an AC power supply scheme (e.g., a typical charger) or a DC (direct-current) charging station that has a DC power supply scheme (e.g., a fast charger). Vehicle 100 includes a charge inlet 110 and a charger 120 (vehicle charger) which support the powering scheme of charging station 200. While FIG. 1 shows charge inlet 110 and charger 120 only, vehicle 100 may include multiple charge inlets and chargers for different powering schemes so as to support multiple types of powering schemes.

A charging cable 300 is connected to charging station 200. In the present embodiment, charging cable 300 is connected to charging station 200 at all times. However, the present disclosure is not limited thereto. Charging cable 300 may be detachable from charging station 200. Charging cable 300 has a charging connector 310 at the tip, and a signal line and a power line are included inside the charging cable 300. A charging connector 310 of charging cable 300, coupled to charging station 200, is connected to charge inlet 110 of vehicle 100, thereby enabling the supply of power from charging station 200 to vehicle 100 through charging cable 300. Charger 120, included in vehicle 100, includes circuits (e.g., a power converter circuit and a filter circuit not shown) for performing given processes on the power input to charge inlet 110. Such process by the circuit allow charger 120 to output to battery 130 the power (DC power) that is suitable for charging the battery 130. Charging station 200 according to the present embodiment corresponds to one example of a "power supply device outside the vehicle" according to the present disclosure.

In addition to charge inlet 110, charger 120, and battery 130, vehicle 100 further includes a travel drive unit 140, an ECU 150, an input device 160, a notification device 170, a location detection unit 180, and driving wheels W. Note that the drive system of vehicle 100 is not limited to the front-wheel drive shown in FIG. 1, and may be the front engine rear wheel drive or the four-wheel drive.

Travel drive unit 140 includes a power control unit (PCU) and a motor generator (MG) none of which are shown. Travel drive unit 140 is configured to cause vehicle 100 to travel using power stored in battery 130. The PCU includes, for example, a control device, which includes a processor, an inverter, and a converter (none of which are shown). The control device included in the PCU is configured to receive instructions (control signals) from ECU 150 and control the inverter and the converter included in the PCU according to the instructions. The MG is a rotating electric machine, for example, a three-phase AC motor generator. The MG is driven by the PCU and causes driving wheels W to rotate.

Although not shown, battery 130 includes a charge relay whose on/off is controlled by ECU 150, a system main relay (SMR) whose on/off is controlled by ECU 150, and a monitoring unit for monitoring conditions of battery 130 (none of which are shown), in addition to the secondary battery mentioned above. The monitoring unit includes various sensors for detecting conditions of battery 130 (e.g., temperature, current, and voltage), and outputs results of the detections to ECU 150. The charge relay is on (a conductive state) while battery 130 is being charged by a power supply device (e.g., charging station 200) which includes a power source outside the vehicle. SMR is disposed on a power supply path from battery 130 to the travel drive unit 140, and is on (conductive state) while vehicle 100 is traveling using the power stored in battery 130. ECU 150 acquires the conditions of battery 130 (e.g., temperature, current, voltage, and SOC (State Of Charge)), based on output of the monitoring unit (detection values of the various sensors).

ECU 150 includes a processor 151, a memory device 152, and a timer 153. For example, a central processing unit (CPU) can be employed as processor 151. Memory device 152 includes a RAM (Random Access Memory) for temporarily storing data, and storages (e.g., a ROM (Read Only Memory) and a rewritable nonvolatile memory) storing various information.

Timer 153 is configured to notify processor 151 of the arrival of a set time. As the time set to timer 153 arrives, timer 153 transmits to processor 151 a signal for notifying the processor 151 of this. A user is allowed to set an arbitrary time to timer 153 through an input device 160 described below. In the present embodiment, a timer circuit is employed as timer 153. However, timer 153 may be implemented by software, rather than hardware (the timer circuit).

In addition to programs that are used for various controls, various parameters which are used in the programs are also pre-stored in the storages included in memory device 152. The various controls are performed by processor 151 executing the programs stored in memory device 152. ECU 150 according to the present embodiment corresponds to one example of a "vehicle control device" according to the present disclosure. ECU 150 according to the present embodiment includes an "execution unit," a "resume process unit," and an "end process unit" according to the present disclosure. For example, the "execution unit," "resume process unit," and "end process unit" are embodied by processor 151 and the programs in memory device 152 which are executed by processor 151. However, the present disclosure is not limited thereto. These units may be embodied by dedicated hardware (electronic circuits).

Input device 160 receives input from the user. Input device 160 is manipulated by the user, and outputs to ECU 150 a signal corresponding to the manipulation by the user. The communication scheme for input device 160 may be wired or wireless. Examples of input device 160 include various switches (a push button the switch, a slide switch, etc.), various pointing devices (mouse, touch pad, etc.), a keyboard, and a touch panel. Input device 160 may be an operating unit of a mobile device (a smartphone, a smart watch, a tablet, etc.) or an operating unit of a car navigation system. In the present embodiment, input device 160 includes a start switch for vehicle 100 (hereinafter, also referred to as a "power switch").

Notification device 170 is configured to perform a given process for giving a notification to the user (e.g., the driver of vehicle 100), upon request from ECU 150. Examples of notification device 170 include a display device (e.g., a meter panel or a head up display), a loudspeaker, and a lamp. Notification device 170 may be a display device and loudspeaker of a mobile device or a display device and loudspeaker of a car navigation system.

Location detection device 180 is configured to detect the position of vehicle 100 or changes in the position. A result of detection by location detection device 180 is output to ECU 150. Location detection device 180 may be a GPS (Global Positioning System) receiver included in the navigation system or a rotation sensor provided on the rotation shafts of driving wheels W. ECU 150 is capable of acquiring a traveling amount (e.g., a travel distance) of vehicle 100, based on the output of location detection device 180.

In vehicle 100 according to the present embodiment, in a situation where the vehicle system is stopped and battery 130 is not being charged, the power switch turns on when the power switch (the start switch included in input device 160) is pressed while the brake pedal (not shown) is being pressed, which activates the vehicle system (and hence ECU 150). The SMR included in battery 130 is then turned on (conductive state) by the activated ECU 150 and the power is supplied to travel drive device 140, thereby making vehicle 100 ready to travel. Moreover, when the vehicle system is activated, the driver of vehicle 100 can turn off the power switch by stopping the vehicle 100, applying the parking brake (not shown), setting the shift position to P (park) using the shift lever (not shown), and pressing the power switch. As the power switch is turned off, the vehicle system (and hence ECU 150) stops. The vehicle system being stopped includes the entire system being stopped completely, and the vehicle system being in a power-saving mode. In the present embodiment, ECU 150 changes to a sleep mode as the power switch is turned off. In the sleep mode, the clock included in processor 151 is stopped while keeping peripheral functions (e.g., timer 153) of processor 151 in operation within ECU 150, without stopping the supply of power to ECU 150. Power consumption in ECU 150 is reduced by stopping the operation of processor 151.

In the present embodiment, when the power switch of vehicle 100 is off, vehicle 100 is made ready to be charged if charging connector 310 of charging cable 300, coupled to charging station 200, is connected to charge inlet 110 of vehicle 100. Although not shown, charge inlet 110 is provided with a sensor (hereinafter, also referred to as a "connection sensor") for sensing that charging connector 310 is locked (and hence the charging cable 300 is connected to vehicle 100). Examples of the connection sensor include a limit switch, a proximity sensor, and a photoelectric sensor. A signal from the connection sensor (a result of sensing) is output to ECU 150. ECU 150 is capable of recognizing the connection state of charging cable 300 (connected/disconnected), based on the signal from the connection sensor. Note that ECU 150 is also capable of recognizing the connection state of charging cable 300 (connected/disconnected), based on a CPLT signal (control pilot signal) or PISW signal (cable connection signal) if charging station 200 is in a form that conforms to "SAE Electric Vehicle Conductive Charge Coupler" standard.

ECU 150 according to the present embodiment has a timer charging function. The timer charging function is a function for performing the timer charging. If the timer charging is reserved in ECU 150, the timer charging is automatically performed in accordance with a preset charge schedule (more particularly, a start time and an end time). During the timer charging, power is supplied from charging station 200 to vehicle 100 (and hence battery 130) through charging cable 300. If vehicle 100 is ready to be charged, the timer charging starts upon arrival of the start time of the charge schedule, and the timer charging ends upon arrival of the end time of the charge schedule. If vehicle 100 is not ready to be charged, the timer charging does not start even though the start time of the charge schedule arrives.

The user operates input device 160, thereby setting a charge schedule to ECU 150 for timer charging, reserving the timer charging in ECU 150, or releasing the reservation for timer charging. Multiple charge schedules (a charge schedule for each timer charging) can be set. A daily, weekly, or monthly charge schedule can be set collectively. Reduction in capacity of battery 130 can be inhibited by charging battery 130 by the timer charging immediately before vehicle 100 starts traveling. Moreover, night-time electricity can be exploited by performing the timer charging at night.

If the timer charging is reserved in ECU 150, battery 130 is not charged until the arrival of the start time of the set charge schedule. However, the user can charge battery 130 (which is different from timer charging) prior to the start time of the charge schedule by releasing the reservation for the timer charging. For example, battery 130 starts charging immediately, if the reservation for the timer charging is released when vehicle 100 is ready to be charged.

By the way, a process which the vehicle control device, included in vehicle 100, is to perform when the user removes charging connector 310 of charging cable 300 from charge inlet 110 of vehicle 100 during the timer charging (i.e., if the cable is removed part way through charging) is contemplated to be killing the timer charging (i.e., forcibly ending the ongoing timer charging, without waiting for the end time). However, if timer charging is always killed when the cable is removed part way through charging, user convenience may be compromised. For example, in a narrow parking lot, charging cable 300 may obstruct pedestrian traffic during the timer charging. In such a situation, a user may wish to temporarily withdraw charging connector 310 of charging cable 300 from charge inlet 110 of vehicle 100, let the pedestrian pass by, and immediately thereafter reconnect charging connector 310 to charge inlet 110 and charge vehicle 100 again. However, if the timer charging is killed as the charging connector 310 is withdrawn from charge inlet 110 as described above, the user needs to set a charge schedule again to allow for timer charging after charging connector 310 is reconnected to charge inlet 110. Moreover, in order to charge the vehicle in a manner different from timer charging, after charging connector 310 is reconnected to charge inlet 110, it takes the user a time to release the reservation for the timer charging. Such an operation is burdensome to the user and decreases the user convenience. Requiring extra steps as the above in the timer charging may prevent the exploitation of the timer charging.

ECU 150 according to the present embodiment is configured to suspend the timer charging when charge inlet 110 of vehicle 100 and charging connector 310 of charging cable 300 are disconnected from each other during the timer charging, resume the suspended timer charging when predetermined resume conditions are met, and end the suspended timer charging without waiting for the end time when the predetermined resume conditions are not met. A requirement necessary to meet the resume conditions is that the charging cable is reconnected after the timer charging is suspended and before the end time of the timer charging. While a requirement sufficient to meet the resume conditions can be set arbitrary, the resume conditions is desirably set so as to be met in situations that demand resumption of timer charging.

Figure 2:
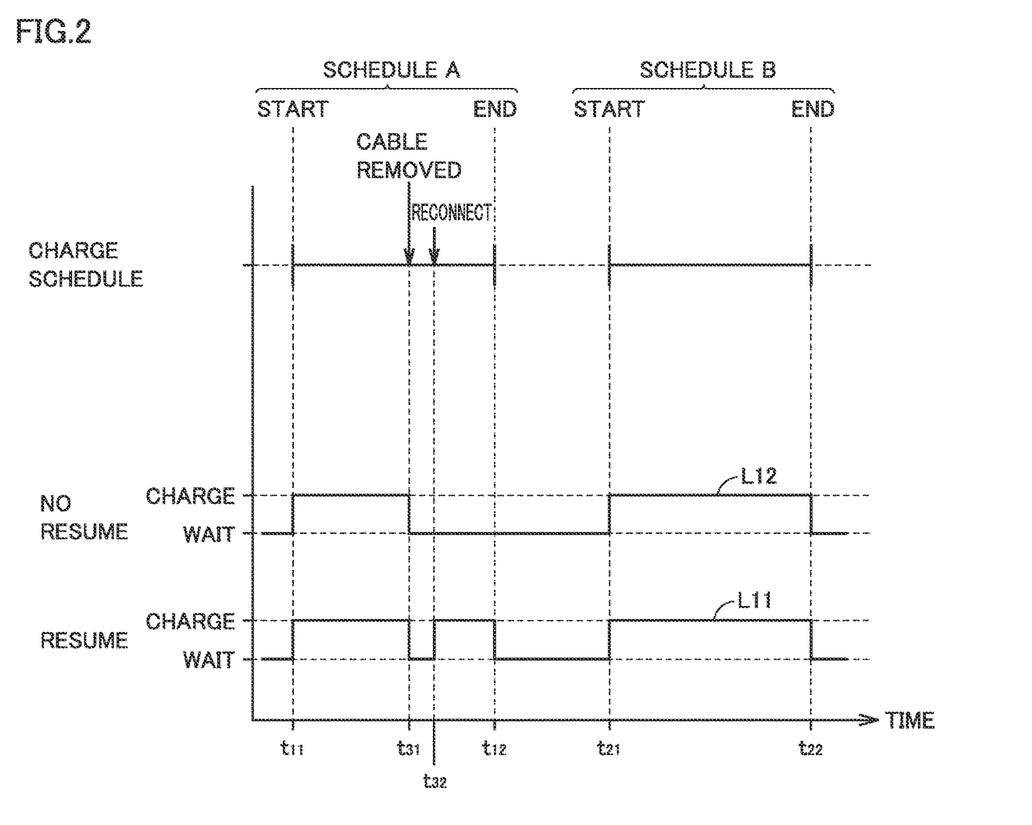
FIG. 2 is a diagram showing an example of performance of timer charging by the vehicle control device according to the embodiment of the present disclosure.

In the following, an operation of ECU 150 will be described, with reference to FIG. 2. FIG. 2 is a diagram showing an example of performance of the timer charging by ECU 150. In this example, the timer charging is reserved in ECU 150 to which schedules A and B, described below, are set, and vehicle 100 is maintained ready to be charged. The reservation of the timer charging is not released. With respect to lines L11, L12 in FIG. 2, "CHARGE" refers to vehicle 100 being charged, and "WAIT" refers to vehicle 100 waiting, without being charged.

Referring to FIG. 2, multiple charge schedules (more particularly, schedules A and B) for different timer charging are set to ECU 150. Schedule A is a charge schedule closest to the current time, and time $t_{11}$ is the start time and time $t_{12}$ is the end time for schedule A. Schedule B is a charge schedule second closest to the current time after schedule A, and time t21 is the start time and time t22 is the end time for schedule B. If the timer charging is reserved, initially, the timer charging according to schedule A (hereinafter, also referred to as "timer charging A") is performed, and then the timer charging according to schedule B (hereinafter, also referred to as "timer charging B") is performed.

Timer charging A is performed at time $t_{11}$. In the example of FIG. 2, at time $t_{31}$, charging connector 310 of charging cable 300 is removed from charge inlet 110 of vehicle 100 during timer charging A. As a result, charging cable 300 is disconnected from vehicle 100. ECU 150 according to the present embodiment suspends timer charging A if charging cable 300 is disconnected from vehicle 100 during timer charging A.

In the example of FIG. 2, timer charging A is suspended at time $t_{31}$, and charging connector 310 of charging cable 300 is reconnected to charge inlet 110 of vehicle 100 at time $t_{32}$ which is prior to the end time (time $t_{12}$) of schedule A. Here, if resume conditions are met, timer charging A resumes as indicated by line L11. The resumed timer charging A ends at the end time (time $t_{12}$) of schedule A. In contrast, if the resume conditions are not met when charging cable 300 is reconnected, timer charging A ends, without waiting for the end time (time $t_{12}$), as indicated by line L12. Timer charging A does not resume when timer charging A is killed part way through as such (i.e., prior to the end time).

Whether timer charging A is resumed (line L11) or killed (line L12), after the end of timer charging A, timer charging B is initiated upon arrival of the start time (time t21) of schedule B, and timer charging B ends upon arrival of the end time (time t22) of schedule B. In the example of FIG. 2, charging cable 300 is not disconnected during timer charging B, and thus timer charging B will not be suspended. However, the process same as that for the timer charging A is performed when charging cable 300 is disconnected during timer charging B.

As the above, if the resume conditions are met when charging cable 300 is reconnected, ECU 150 according to the present embodiment resumes the suspended timer charging, without killing it. As a result, an enhanced user convenience is allowed in the timer charging.

The resume conditions are set so as to be met in situations that demand resumption of the suspended timer charging A. In the present embodiment, the resume conditions are met if, after charging cable 300 is disconnected, charging cable 300 is reconnected prior to the end time of the timer charging (more particularly, the suspended timer charging), without vehicle 100 starting travelling. If the user reconnects charging cable 300 before vehicle 100 starts travelling, the user is highly likely to wish the suspended timer charging to be resumed (i.e., the user is willing to continue the timer charging).

Figure 3:
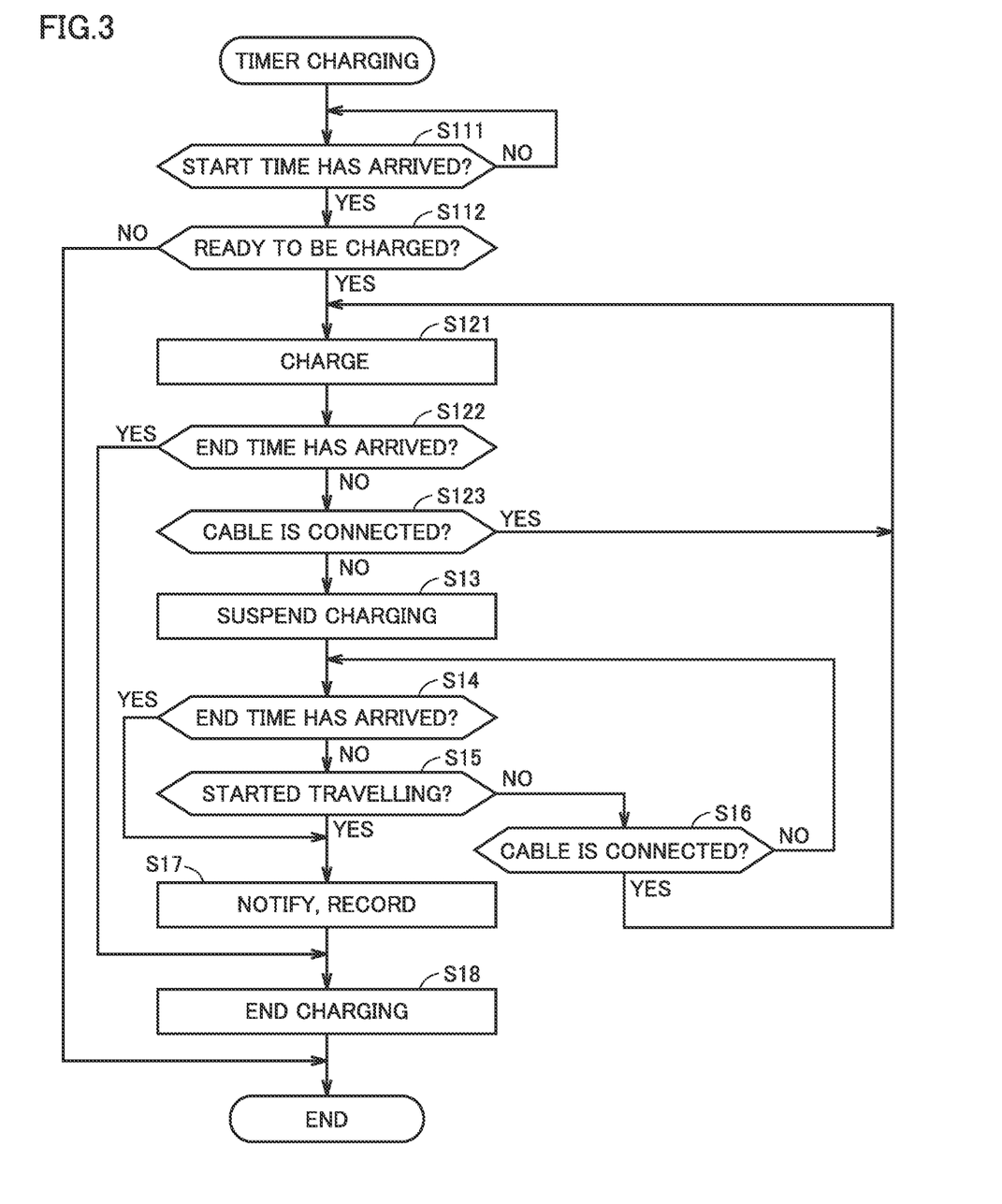
FIG. 3 is a flowchart illustrating a procedure for the timer charging performed by the vehicle control device according to the embodiment of the present disclosure.

FIG. 3 is a flowchart illustrating a procedure for the timer charging performed by ECU 150 according to the present embodiment. The processing illustrated in the flowchart is initiated once the power switch of vehicle 100 is turned off while the timer charging is reserved in ECU 150.

Referring to FIGS. 1 and 3, at step (hereinafter, also expressed simply as "S") 111, it is determined whether the start time for the charge schedule set to ECU 150 has arrived. This determination is made by timer 153. If the start time of the charge schedule has arrived (YES at S111), timer 153 sends to processor 151 a signal for notifying of the arrival of the start time (hereinafter, also referred to as a "start signal"). The process step S111 is repeated until the start signal is transmitted (i.e., while it is determined NO at S111).

When processor 151 receives the start signal from timer 153, processor 151 recovers from the sleep mode. When the start time of the charge schedule has arrived (YES at S111), ECU 150 is put in a typical operation state, and the process proceeds to S112. ECU 150 determines, at S112, whether vehicle 100 is ready to be charged. When the power switch of vehicle 100 is off and vehicle 100 and charging station 200 are connected to each other via charging cable 300, it is determined to be YES at S112, and the process proceeds to S121. When the power switch of vehicle 100 is on and/or charging cable 300 is disconnected from vehicle 100, it is determined to be NO at S112, and the series of processes illustrated in FIG. 3 ends. In this case, the timer charging ends without being started (performed).

At S121, ECU 150 turns on (changes to the conductive state) the charge relay (not shown) of battery 130 and charges battery 130. As a result, the timer charging is performed. During the timer charging, power is supplied from charging station 200 to vehicle 100 (and hence battery 130) through charging cable 300. ECU 150 may control charger 120 during charging so that desired power is supplied to battery 130.

At S122, it is determined whether the end time of the charge schedule set to ECU 150 has arrived. The determination is made by ECU 150. ECU 150 may use timer 153 (timer circuit) to make the above determination, for example. However, the present disclosure is not limited thereto. ECU 150 may use software to make the above determination. For example, a counter (variable) may be available in memory device 152, and ECU 150 may determine whether the counter value has reached a given value, while incrementing the counter for each control cycle.

When the end time of the charge schedule has arrived (YES at S122), the process proceeds to S18. At S18, ECU 150 turns off (changes to blocked state) the charge relay (not shown) of battery 130 to end the charging of battery 130. As a result, the timer charging ends.

At S123, ECU 150 determines the connection state of charging cable 300 (connected/disconnected). ECU 150 is capable of determining whether charging cable 300 of vehicle 100 is connected or disconnected, based on a signal from the connection sensor mentioned above. In the present embodiment, when charging connector 310 of charging cable 300 is connected to charge inlet 110 of vehicle 100, it is determined to be YES at S123, and the process returns to S121.

While it is determined to be NO at S122 and YES at S123, the process steps S121 to S123 are repeated for each given control cycle, thereby continuously performing the timer charging. When charging connector 310 of charging cable 300 is withdrawn from charge inlet 110 of vehicle 100 during the timer charging, it is determined to be NO at S123, and the process proceeds to S13.

At S13, ECU 150, for example, turns off (changes to the blocked state) the charge relay (not shown) of battery 130, thereby suspending the ongoing timer charging. Note that the timer charging may be suspended in any manner. ECU 150 may suspend the timer charging by controlling the switching element included in charger 120 and stopping the output of charger 120.

After the process step S13, it is determined, at S14, whether the end time of the charge schedule set to ECU 150 has arrived. The process step S14 is the same as S122 mentioned above. When the end time of the charge schedule has arrived (YES at S14), the process proceeds to S17 described below. When the end time of the charge schedule has not arrived on the other hand (NO at S14), the process proceeds to S15.

At S15, ECU 150 determines whether vehicle 100 has started travelling. ECU 150 determines that vehicle 100 has not started travelling yet (NO at S15) when vehicle 100 does not travel a given distance or longer from the position of vehicle 100 at the time the charging cable 300 is disconnected. ECU 150 determines that vehicle 100 has started travelling (YES at S15) when vehicle 100 travels the given distance or longer. The given distance is a threshold according to which ECU 150 determines whether vehicle 100 has started travelling. The given distance may be a fixed value (e.g., about 10 m) or changeable by the user. The user may be allowed to input (and hence set) an arbitrary distance to ECU 150. The user may consider the size of the parking lot or the size of the garage to determine the given distance.

The method of determination as to whether vehicle 100 has started travelling is not limited to the above. For example, vehicle 100 may be determined as having started travelling when vehicle 100 has left the garage (or when moved the given distance away from the garage). If a GPS receiver is employed as location detection device 180, ECU 150 is capable of acquiring the location of vehicle 100, based on output of the GPS receiver. Vehicle 100 may also be determined as having started travelling when the traveling speed of vehicle 100 (the vehicle speed) reaches a given value or higher. If a rotation amount sensor is employed as location detection device 180, ECU 150 is capable of acquiring amounts of rotation of driving wheels W (i.e., the vehicle speed of vehicle 100) per unit time, based on output of the rotation amount sensor. Furthermore, the shift position may be considered when determining whether vehicle 100 has started travelling.

When it is determined to be NO at S15, the process proceeds to S16. At S16, ECU 150 determines whether charging connector 310 of charging cable 300 is reconnected to charge inlet 110 of vehicle 100. When charging cable 300 is connected to charge inlet 110, it is determined to be YES at S16, and the process returns to S121. As a result, battery 130 is charged at S121 and the timer charging resumes. The condition where it is determined to be YES at S16 means that the resume conditions are met. In the present embodiment, after charging cable 300 is disconnected (NO at S123), if vehicle 100 does not start travelling (NO at S15), and charging cable 300 is reconnected (YES at S16) before the end time of the timer charging (NO at S14), the resume conditions are met. Consequently, the timer charging, suspended at S13, resumes.

When charging cable 300 remains disconnected, it is determined to be NO at S16, and the process returns to S14. During a period in which it is determined to be NO all the way from S14 through S16, the process steps S14 to S16 are repeated for each given control cycle. When vehicle 100 starts travelling in this period (YES at S15), the process proceeds to S17.

When it is determined to be YES at S14 or S15 and the process proceeds to S17, the timer charging suspended at S13 is not to be resumed (i.e., ends part way through). At S17, ECU 150 notifies and records that the timer charging has ended part way through. ECU 150 may display the information (e.g., text and image), on notification device 170 (e.g., a display device of a smartphone), for notifying the user that the timer charging has ended part way through. ECU 150 may change the value (the initial value is off) of a flag stored in memory device 152 to on, thereby recording that the timer charging has ended part way through into memory device 152. Note that the way of notification to the user is not limited to displaying the above information. The information may be notified to the user in sound (including a voice) or by lighting on a given lamp (including blinking).

After the process step S17, the process proceeds to S18 mentioned above. As a result, the timer charging ends. Note that ECU 150 may notify and record as the above (S17) after the end of the timer charging. When to notify and record as the above may be any time insofar as it is after it is determined to be YES at S15. The user is able to confirm, from the notification and record, that the timer charging has ended part way through (and hence the timer charging is not to be resumed).

As described above, ECU 150 (the vehicle control device) according to the present embodiment includes the execution unit, resume process unit, and end process unit described below. The execution unit is configured to perform the timer charging, using preset start time and end time (S111, S112, S14, S18). When the predetermined resume conditions are not met (YES at S15), the end process unit is configured to at least notify or record (both in the present embodiment) that the timer charging has ended part way through (S17).

When the charging cable is disconnected during the timer charging (NO at S123), the resume process unit is configured to suspend the timer charging (S13), and when the predetermined resume conditions are met (YES at S16), resume the suspended timer charging, without killing it (S121). When the predetermined resume conditions are met, the suspended timer charging is automatically resumed without requiring user operation. As a result, an enhanced user convenience is allowed in the timer charging.

When vehicle 100 is sensed as having started traveling (more particularly, when vehicle 100 travels a given distance or longer) in the period from when the charging cable 300 is disconnected (NO at S123) to when the charging cable 300 is reconnected (YES at S16), the resume process unit is configured to determine that the predetermined resume conditions are not met (YES at S15), and kills the timer charging at S18. As a result, the control of the vehicle smoothly transitions from charging control to traveling control.

The resume conditions are not limited to the above. The resume conditions may be set arbitrarily insofar as they include charging cable 300 as being reconnected after the timer charging is suspended and before the end time. For example, S15 may be skipped in the processing of FIG. 3, and the resume conditions may always be met (i.e., the timer charging suspended at S13 is resumed) when charging cable 300 is reconnected after the timer charging is suspended and before the end time. Moreover, variations may be made to the processing of FIG. 3, as follows.

Figure 4:
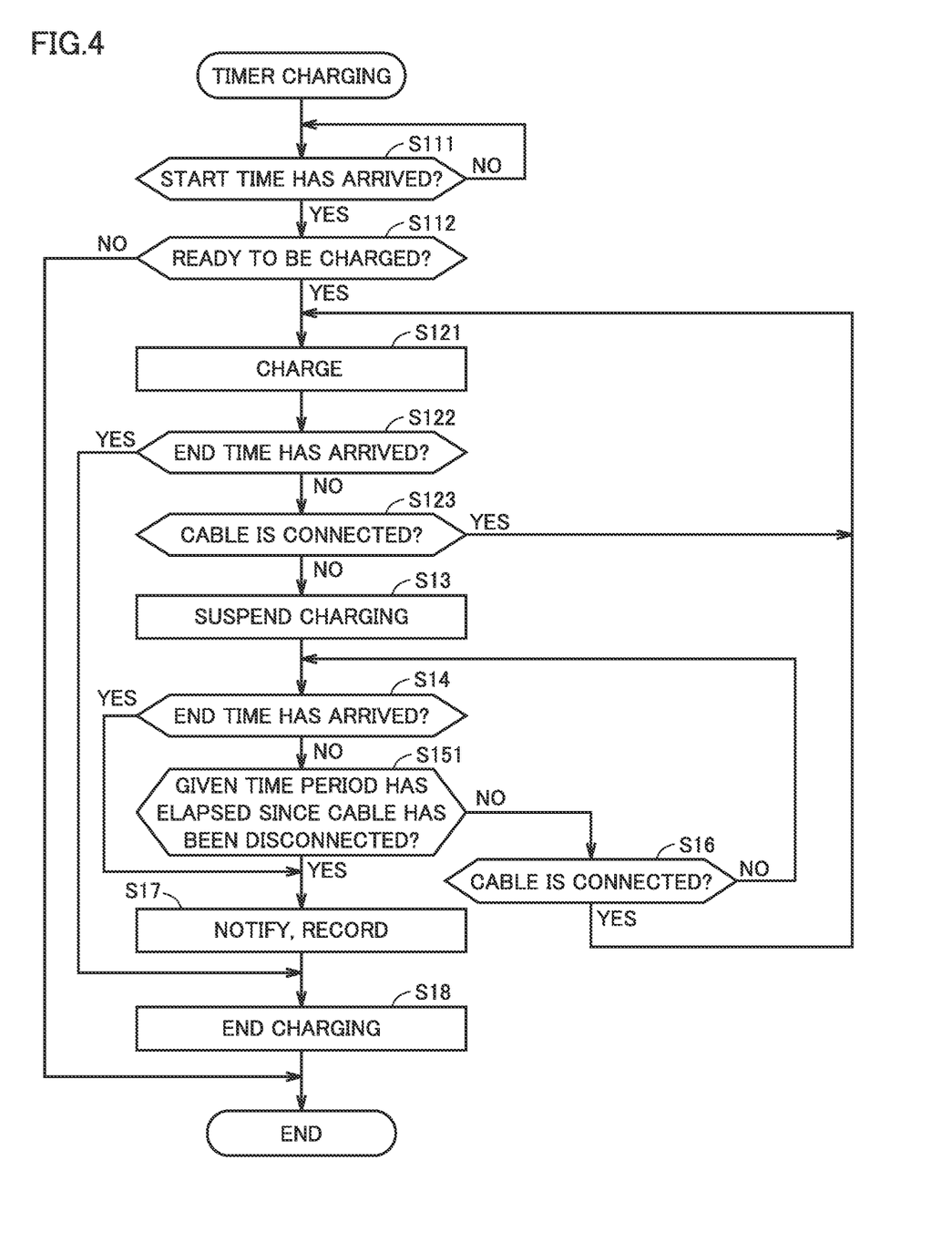
FIG. 4 is a flowchart illustrating a procedure for timer charging according to Variation 1.

FIG. 4 is a flowchart illustrating a procedure for timer charging according to Variation 1. The processing of FIG. 4 employs S151, instead of S15 in the processing of FIG. 3. Referring to FIG. 4, at S151, ECU 150 determines whether a given time period has elapsed since the charging cable 300 has been disconnected (e.g., it has been determined to be NO at S123). ECU 150 may use a timer 153 to make the above determination, for example. However, the present disclosure is not limited thereto. ECU 150 may use software to make the above determination. The given time period may be a fixed value (e.g., about 5 minutes) or changeable by the user. The user may be allowed to input (and hence set) an arbitrary time to ECU 150. In Variation 1, before the end time of the timer charging (NO at S14), when charging cable 300 is reconnected (YES at S16) without an elapse of a given time period (NO at S151) since charging cable 300 has been disconnected (NO at S123), the resume conditions are met. Consequently, the timer charging, suspended at S13, resumes (S121). The user who has immediately reconnected charging cable 300, without leaving it disconnected for a while, is highly likely to wish the suspended timer charging to be resumed.

Figure 5:
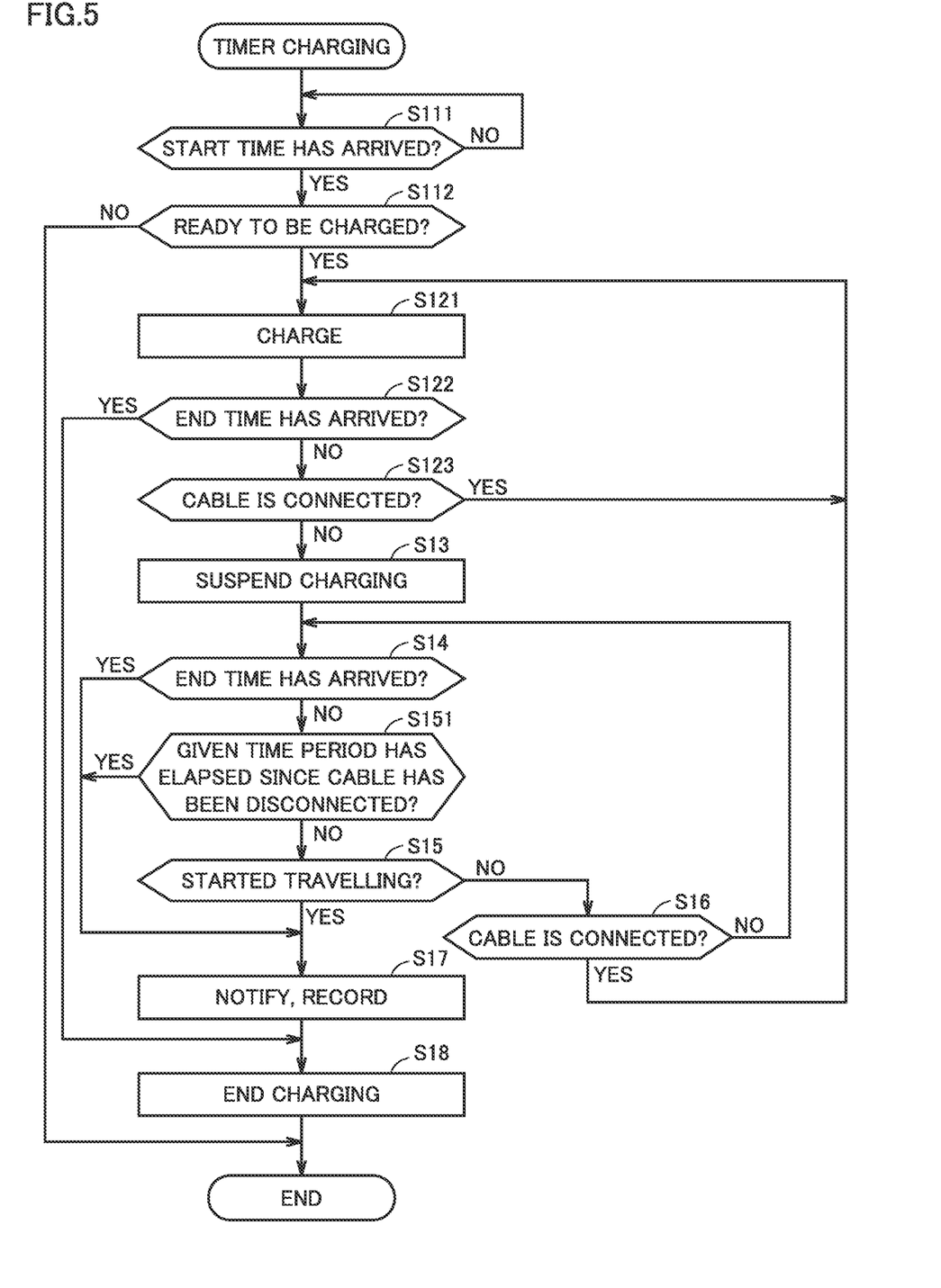
FIG. 5 is a flowchart illustrating a procedure for timer charging according to Variation 2.

FIG. 5 is a flowchart illustrating a procedure for timer charging according to Variation 2. The processing of FIG. 5 employs S151 of FIG. 4, in addition to S15 of FIG. 3. Referring to FIG. 5, in Variation 2, before the end time of the timer charging (NO at S14), when charging cable 300 is reconnected (YES at S16) without an elapse of the given time period since charging cable 300 has been disconnected (NO at S123) and without vehicle 100 starting traveling (NO at S151 and S15), the resume conditions are met. Consequently, the timer charging, suspended at S13, resumes (S121).

In each processing of FIGS. 3 to 5 above, it is determined, at S123, S16, whether charging cable 300 is connected to vehicle 100. However, if charging cable 300 is detachable from charging station 200, it may be determined, at S123, S16, whether charging cable 300 is connected to vehicle 100 and charging station 200. In this case, when charging cable 300 is connected to vehicle 100 and charging station 200, it is determined to be YES at S123, S16. When charging cable 300 is disconnected from either one of vehicle 100 and charging station 200, it is determined to be NO at S123, S16. ECU 150 is capable of determining the connection state of charging cable 300 (connected/disconnected), based on a signal (e.g., CPLT signal) from charging cable 300.

S17 in FIGS. 3 to 5 above may be excluded from the processing if the step is not necessary. Moreover, ECU 150 may either notify or record as the above.

Charging conditions (e.g., a charge schedule, and the amount of charge) for the timer charging to be resumed when the resume conditions are met, may be different from those before the timer charging is suspended. For example, the charging conditions may be re-configured before the timer charging is resumed, thereby replenishing an amount of power, uncharged while the timer charging is suspended (hereinafter, also referred to simply as a "suspension period"), by the resumed timer charging.

Figure 6:
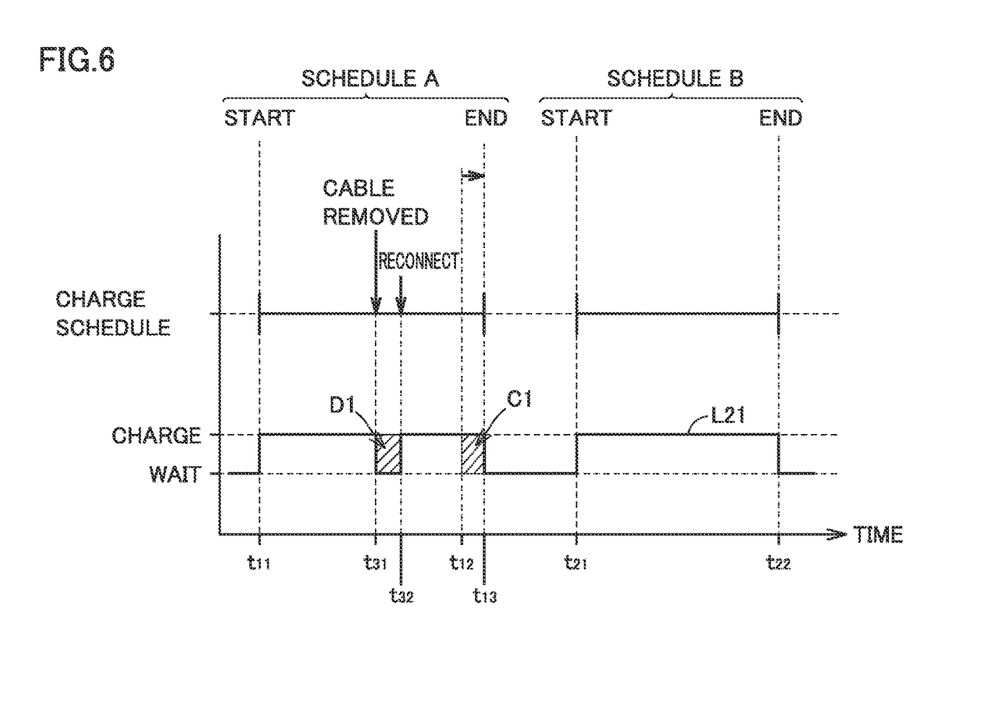
FIG. 6 is a diagram for illustrating a first example of a method of replenishment of an amount of power uncharged during a suspension period.

FIG. 6 is a diagram for illustrating a first example of the method of replenishment of the amount of power uncharged during the suspension period. Referring to FIG. 6, time $t_{12}$ is the end time of timer charging A that is set before timer charging A is suspended. Time $t_{13}$ is the end time that is changed for timer charging A to be resumed. In the example of FIG. 6, ECU 150 changes, at time $t_{32}$, the end time of timer charging A when it is determined to be YES (the resume conditions are met) at S16 in the processing illustrated in any of FIGS. 3 to 5. ECU 150 puts off the end time of timer charging A and resumes timer charging A so that a power amount D1, which is an amount of power uncharged while timer charging A is being suspended (time $t_{31}$ to time $t_{32}$), is replenished. The end time is changed from time $t_{12}$ to time $t_{13}$. As a result, timer charging A is performed as indicated by line L21 in FIG. 6.

In the first example above, ECU 150 includes a first change unit which is configured to change, when the predetermined resume conditions are met, the end time of the resumed timer charging so that at least a portion of the amount of power uncharged while the timer charging is suspended is replenished. By the first change unit putting off the end time of timer charging A to be resumed, an insufficient amount of charge due to the suspension can be replenished by the resumed timer charging A. Power amount C1 that is charged during a period (time $t_{12}$ to time $t_{13}$) extended by changing the end time as the above is the same as power amount D1, for example. However, the present disclosure is not limited thereto. In addition to power amount D1, the SOC of battery 130 may also be considered when determining the end time of the resumed timer charging A.

Note that since the charge schedule for timer charging A may be set in accordance with a time period where an electricity cost is inexpensive, permitting the user to change the charge schedule (more particularly, a change to the end time) is not always a benefit to the user. Thus, the user may be allowed to previously select (i.e., set to ECU 150) one of a mode in which changes to the charge schedule is permitted (hereinafter, also referred to as "change permitted mode") and a mode in which changes to the charge schedule is not permitted (hereinafter, also referred to as "change not permitted mode"). For example, when the user selects the change permitted mode through input device 160, the value of the permission flag in memory device 152 may be set to on. When the user selects the change not permitted mode through input device 160, the value of the permission flag in memory device 152 may be set to off. The first change unit included in ECU 150 may change the end time of timer charging A if the value of the permission flag is on when the resume conditions are met, and the first change unit may not change the end time of timer charging A if the value of the permission flag is off when the resume conditions are met (see FIG. 6). Note that the value of the permission flag (the initial value) before the user selects a mode may be either on or off.

Figure 7:
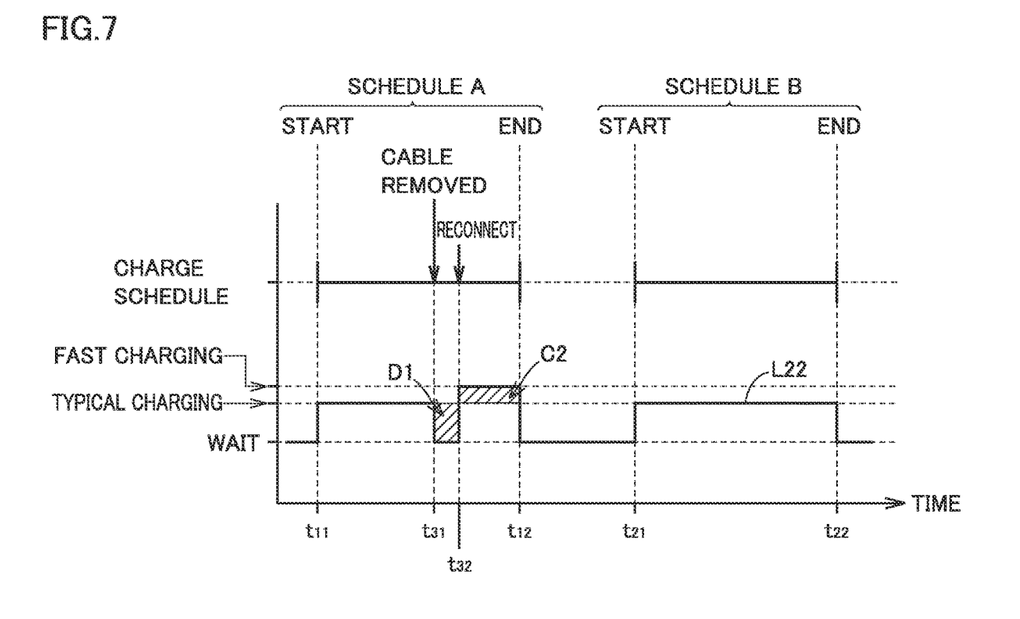
FIG. 7 is a diagram for illustrating a second example of the method of replenishment of the amount of power uncharged during the suspension period.

FIG. 7 is a diagram for illustrating a second example of the method of replenishment of the amount of power uncharged during the suspension period. With respect to the line L22 in FIG. 7, "TYPICAL CHARGING" refers to a typical timer charging, and "FAST CHARGING" refers to charging according to which the amount of charge per unit time is greater than the typical charging.

Referring to FIG. 7, timer charging A before being suspended is typical charging. However, in the example of FIG. 7, ECU 150 changes the charge rate (i.e., the amount of charge per unit time) of timer charging A when the process step S16 at time $t_{32}$ illustrated in any of FIGS. 3 to 5 mentioned above is YES (the resume conditions are met). ECU 150 increases the amount of charge per unit time by timer charging A so that power amount D1 uncharged while timer charging A is being suspended (time $t_{31}$ to time $t_{32}$) is replenished, and then resumes timer charging A. As a result, timer charging A is performed as indicated by line L22 in FIG. 7. The resumed timer charging A is fast charging, thereby allowing the amount of charge, which is insufficient due to the suspension, to be replenished by the resumed timer charging A.

In the second example above, ECU 150 includes a second change unit configured to change, when the predetermined resume conditions are met, an amount of charge per unit time of the resumed timer charging so that at least a portion of an amount of power uncharged while the timer charging is suspended is replenished. The second change unit changes the charge rate of timer charging A, thereby allowing the amount of charge, insufficient due to the suspension, to be replenished by the resumed timer charging, without changing the charge schedule set by the user. The second change unit, for example, controls the switching element included in charger 120, thereby adjusting the amount of charge per unit time. Power amount C2, which is increased by changes in the amount of charge per unit time as the above, is, for example, the same as power amount D1. However, the present disclosure is not limited thereto. The second change unit may consider SOC of battery 130, in addition to power amount D1, when determining the amount of charge per unit time of the resumed timer charging A.

ECU 150 may include both the first change unit and the second change unit described above. When the predetermined resume conditions are determined to be met, ECU 150 may change not only the charge rate of timer charging A, but also the end time of timer charging A.

Figure 8:
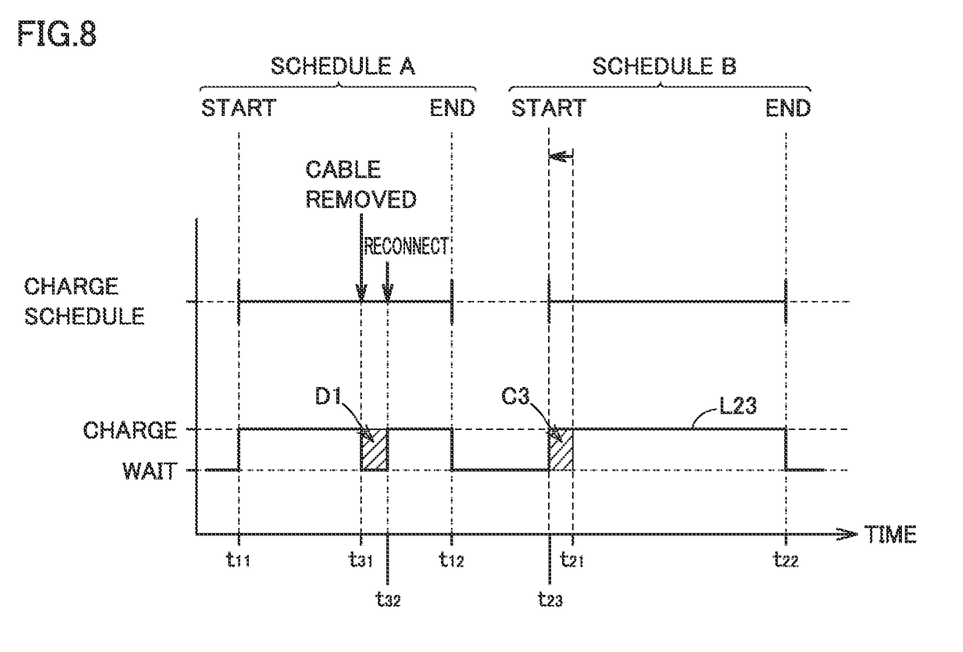
FIG. 8 is a diagram for illustrating a third example of the method of replenishment of the amount of power uncharged during the suspension period.

ECU 150 may be configured to replenish the amount of power uncharged during the suspension period (i.e., the amount of power uncharged during suspension of timer charging) by changing, when the timer charging is suspended, the charge schedule of other timer charging set to ECU 150. FIG. 8 is a diagram for illustrating a third example of the method of replenishment of the amount of power uncharged during the suspension period.

Referring to FIG. 8, time t21 is the start time of timer charging B before being changed. Time t23 is the start time of timer charging B after being changed. In the example of FIG. 8, ECU 150 changes the start time of timer charging B when timer charging A ends at time $t_{12}$ in the process step S18 illustrated in any of FIGS. 3 to 5 mentioned above. ECU 150 advances the start time for timer charging B so that power amount D1, which is uncharged while timer charging A is being suspended (time $t_{31}$ to time $t_{32}$), is replenished. The start time is changed from time t21 to time t23. As a result, the timer charging is performed as indicated by line L23 in FIG. 8.

In the third example above, ECU 150 includes a third change unit configured to change, when the predetermined resume conditions are met, at least one of the start time and the end time of timer charging B (a second timer charging) so that at least a portion of the amount of power, uncharged while timer charging A (a first timer charging) is suspended is replenished by timer charging B. The third change unit moves advances the start of timer charging B, thereby allowing the amount of charge, insufficient due to the suspension of timer charging A, to be replenished by timer charging B. A power amount C3 that is charged during a period (time t23 to time t21) extended by changing the start time is, for example, the same as power amount D1. However, the present disclosure is not limited thereto. The SOC of battery 130 may be considered, in addition to power amount D1, when determining the start time of timer charging B.

The user may be allowed to previously select (i.e., set to ECU 150) one of the above change permitted mode and change not permitted mode. If the value of the permission flag is on when the resume conditions are met, the third change unit included in ECU 150 may change the start time of timer charging B (see FIG. 8), and the start time of timer charging B may not be changed if the value of the permission flag is off when the resume conditions are met.

While ECU 150 advantages the start time of the timer charging B in the example of FIG. 8, ECU 150 may delay the end time of timer charging B. Alternatively, ECU 150 may change both the start time and end time of timer charging B. ECU 150 may include the above-described first change unit, second change unit, and third change unit. ECU 150 may be configured to replenish the portion of power amount D1 with at least one of power amount C1 illustrated in FIG. 6 and power amount C2 illustrated in FIG. 7, and replenish the rest of power amount D1 with power amount C3 illustrated FIG. 8.

The "first change unit," "second change unit," and "third change unit" described above are embodied in, for example, processor 151 shown in FIG. 1 and the programs in memory device 152 which are executed by processor 151. However, the present disclosure is not limited thereto. These units may be embodied by dedicated hardware (electronic circuits).

Although the embodiment of the present disclosure has been described, it should be understood that the embodiment disclosed herein is illustrative and non-restrictive in every respect. The scope of the present disclosure is defined by the scope of the claims, and is intended to include any modifications within the scope and meaning equivalent to the scope of the claims.

What is claimed is:

1. A vehicle control device configured to perform a timer charging to supply a vehicle with power from a power supply device outside the vehicle through a charging cable, the timer charging being charging which starts charging a battery mounted in the vehicle upon arrival of a start time and ends charging the battery upon arrival of an end time, the vehicle control device comprising:
   an execution unit configured to perform the timer charging, using the start time and the end time which are preset; and
   a resume process unit configured to
   suspend the timer charging when the charging cable is disconnected from at least one of the vehicle and the power supply device during the timer charging,
   resume the suspended timer charging when predetermined resume conditions are met, and
   end the suspended timer charging without waiting for the end time when the vehicle has entered a predetermined state without the predetermined resume conditions being met,
   the predetermined resume conditions including a condition in which the disconnected charging cable is reconnected after the timer charging is suspended and before the end time,
   wherein when the predetermined resume conditions are met, the resume process unit resumes the suspended timer charging and increases an amount of charge per unit time by the timer charging so that a power amount uncharged while the timer charging is being suspended is replenished.

2. The vehicle control device according to claim 1, wherein
   the predetermined resume conditions are met when the charging cable is reconnected before the end time, without the vehicle starting travelling, since the charging cable has been disconnected and the timer charging has been suspended.

3. The vehicle control device according to claim 1, wherein
   the predetermined resume conditions are met when the charging cable is reconnected before the end time, without an elapse of a given time period since the charging cable has been disconnected and the timer charging has been suspended.

4. The vehicle control device according to claim 1, wherein
   the resume process unit is configured to determine that the vehicle has entered the predetermined state without the predetermined resume conditions being met when the vehicle travels a given distance or longer in a period from when the charging cable is disconnected and the timer charging is suspended to when the charging cable is reconnected.

5. The vehicle control device according to claim 1, further comprising
a first change unit configured to change, when the predetermined resume conditions are met, the end time of the resumed timer charging so that at least a portion of an amount of uncharged power is replenished, the uncharged power being power uncharged while the timer charging is suspended.

6. The vehicle control device according to claim 1, further comprising
a second change unit configured to change, when the predetermined resume conditions are met, an amount of charge per unit time of the resumed timer charging so that at least a portion of an amount of uncharged power is replenished, the uncharged power being power uncharged while the timer charging is suspended.

7. The vehicle control device according to claim 1, wherein
the execution unit is configured to set a start time and an end time for each of a plurality of timer chargings,
the plurality of timer chargings including a first timer charging and a second timer charging,
the vehicle control device further comprising
a third change unit configured to change, when the predetermined resume conditions are met, at least one of a start time and an end time of the second timer charging so that at least a portion of an amount of uncharged power is replenished by the second timer charging, the uncharged power being power uncharged while the first timer charging is suspended.

8. The vehicle control device according to claim 1, further comprising an end process unit configured to at least notify or record that the timer charging has ended part way through, when the vehicle has entered the predetermined state without the predetermined resume conditions being met.

9. The vehicle control device according to claim 1, wherein
the resume process unit is configured to determine that the vehicle has entered the predetermined state when the vehicle has started travelling.

10. The vehicle control device according to claim 9, wherein
the resume process unit is configured to determine that the vehicle has entered the predetermined state when the vehicle travels a predetermined distance or longer.

11. The vehicle control device according to claim 1, wherein
when the predetermined resume conditions are met, the resume process unit puts off the end time of the suspended timer charging and resumes the suspended timer charging.

12. The vehicle control device according to claim 1, wherein
when the predetermined resume conditions are met after the resume process unit suspends the timer charging, the vehicle control device sets charging conditions for the timer charging to be resumed so that the charging conditions are different from charging conditions for the timer charging before the timer charging is suspended.

13. The vehicle control device according to claim 1, wherein
the vehicle control device further comprising a memory device that stores a permission flag,
when the predetermined resume conditions are met and the value of the permission flag is on, the resume process unit changes the end time of the suspended timer charging and resumes the suspended timer charging, and
when the predetermined resume conditions are met and the value of the permission flag is off, the resume process unit does not change the end time of the suspended timer charging and resumes the suspended timer charging.

14. The vehicle control device according to claim 1, wherein
the vehicle control device is configured to set a start time and an end time for each of a first timer charging and a second timer charging, and
when the vehicle has entered the predetermined state without the predetermined resume conditions being met after the resume process unit suspends the first timer charging, the resume process unit changes the start time of the second timer charging and ends the first timer charging without waiting for the end time of the first timer charging.

15. A vehicle control device configured to perform a timer charging to supply a vehicle with power from a power supply device outside the vehicle through a charging cable, the timer charging being charging which starts charging a battery mounted in the vehicle upon arrival of a start time and ends charging the battery upon arrival of an end time, the vehicle control device comprising:
an execution unit configured to perform the timer charging, using the start time and the end time which are preset; and
a resume process unit configured to
suspend the timer charging when the charging cable is disconnected from at least one of the vehicle and the power supply device during the timer charging,
resume the suspended timer charging when predetermined resume conditions are met, and
end the suspended timer charging without waiting for the end time when the vehicle has entered a predetermined state without the predetermined resume conditions being met,
the predetermined resume conditions including a condition in which the disconnected charging cable is reconnected after the timer charging is suspended and before the end time,
when the predetermined resume conditions are met, the resume process unit resumes the suspended timer charging at one of a typical charging or a fast charging, the fast charging including an amount of charge per unit time being greater than that of the typical charging.

16. The vehicle control device according to claim 1, wherein
the resume process unit is configured to determine that the vehicle has entered the predetermined state when the vehicle has started travelling.

17. The vehicle control device according to claim 16, wherein
the resume process unit is configured to determine that the vehicle has entered the predetermined state when the vehicle travels a predetermined distance or longer.

18. The vehicle control device according to claim 1, wherein
when the predetermined resume conditions are met, the resume process unit puts off the end time of the suspended timer charging and resumes the suspended timer charging.

19. The vehicle control device according to claim 1, wherein when the predetermined resume conditions are met after the resume process unit suspends the timer charging, the vehicle control device sets charging conditions for the timer charging to be resumed so that the charging conditions are different from charging conditions for the timer charging before the timer charging is suspended.

20. The vehicle control device according to claim 1, wherein the vehicle control device further comprising a memory device that stores a permission flag, when the predetermined resume conditions are met and the value of the permission flag is on, the resume process unit changes the end time of the suspended timer charging and resumes the suspended timer charging, and when the predetermined resume conditions are met and the value of the permission flag is off, the resume process unit does not change the end time of the suspended timer charging and resumes the suspended timer charging.

* * * * *